United States Patent
Yang et al.

(10) Patent No.: US 6,874,903 B2
(45) Date of Patent: Apr. 5, 2005

(54) ILLUMINATED LOGO DEVICE

(75) Inventors: Pang-Lun Yang, TaiChung (TW);
Ting-Hui Chih, HuaLien (TW)

(73) Assignee: Benq Corporation, TaoYuan (TW)

( * ) Notice: Subject to any disclaimer, the term of this patent is extended or adjusted under 35 U.S.C. 154(b) by 0 days.

(21) Appl. No.: 10/734,229

(22) Filed: Dec. 15, 2003

(65) Prior Publication Data

US 2004/0212983 A1 Oct. 28, 2004

(Under 37 CFR 1.47)

(30) Foreign Application Priority Data

Apr. 22, 2003 (TW) .......................................... 92109286 A

(51) Int. Cl.⁷ ............................................. F21V 33/00
(52) U.S. Cl. ............................. 362/31; 362/27; 362/812
(58) Field of Search .............................. 362/26, 27, 29, 362/30, 31, 561, 812; 40/546; 349/58, 65

(56) References Cited

U.S. PATENT DOCUMENTS 6,494,593 B2 * 12/2002 An et al. ....................... 362/29
6,672,748 B2 * 1/2004 Baldwin ....................... 362/26
6,736,534 B1 * 5/2004 Fite .............................. 362/31

* cited by examiner

Primary Examiner—Y. My Quach-Lee
(74) Attorney, Agent, or Firm—Birch, Stewart, Kolasch & Birch, LLP.

(57) ABSTRACT

The present invention is related to an illuminated logo device positioned in a display. The display has a light source and a light guiding plate, and the illuminated logo device has a logo, a casing, a lid, and a light transmitting device. The casing has an encapsulating space, and a groove with a first opening is arranged on the casing for receiving the logo. The lid is positioned above and a predetermined distance away from the casing. Moreover, the lid has a through hole corresponding to the first opening. The light transmitting device is positioned in the through hole and the first opening, and the light transmitting device has a first end surface and a second end surface. The first end surface of the light transmitting device is faced to the first opening and the second end surface contacts the light guiding plate for guiding lights of the light source to the logo via the light transmitting device and the light guiding plate, such that the logo is illuminated without any additional light source.

9 Claims, 3 Drawing Sheets

ILLUMINATED LOGO DEVICE

BACKGROUND OF THE INVENTION

This Nonprovisional application claims priority under 35 U.S.C. § 119(a) on Patent Application No(s). 092109286 filed in TAIWAN on Apr. 22, 2003, the entire contents of which are hereby incorporated by reference.

(a). Field of the Invention

The invention relates to an illuminated logo device, more particularly, to an illuminated logo device for a display.

(b). Description of the Prior Arts

Following the rapid development of modern technology, the electronic products are becoming lighter, thinner, shorter, and smaller. Therefore, the urgent task of the manufacturers is: how to develop an electronic product having both artistic appearance and superior function, so that the product is most acceptable by public.

Both the desktop computer and notebook computer use displays for displaying data. Further, for the purpose of advertising, almost all manufacturers will design a logo on the casing of the display so as to distinguish it from other brands.

A logo can have its special functions. For example, when the computer is placed in a dark location, an illuminated logo can be the best indicator showing the exact position of the computer. However, an additional light source inside the computer is required for illuminating the logo. Adding the additional light source will increase the cost and the size of these computers or other electronic products. Therefore, this situation is an urgent problem of the manufacturer that requires immediate solution.

SUMMARY OF THE INVENTION

An objective of the present invention is to provide an illuminated logo device without any additional light source.

In order to reach the above objective, the present invention is related to an illuminated logo device of a display having a light source and a light guiding plate. The illuminated logo device has a logo, a casing, a lid, and a light transmitting device.

The casing has an encapsulating space, and a groove with a first opening is arranged on the casing for receiving the logo. The lid is positioned above and a predetermined distance away from the casing. Moreover, the lid has a through hole corresponding to the first opening. The light transmitting device is positioned in the through hole and the first opening, and the light transmitting device has a first end surface and a second end surface. The first end surface of the light transmitting device is faced to the first opening and the second end surface contacts the light guiding plate for guiding lights of the light source to the logo via the light transmitting device and the light guiding plate, such that the logo is illuminated without any additional light source.

DESCRIPTION OF THE PREFERRED EMBODIMENT

The logo is illuminated because the illuminated logo device can guide lights of the display via the light guiding plate of the display and the light transmitting device of the illuminated logo device. Therefore, the illuminated logo device has no additional light source.

Figure 1:
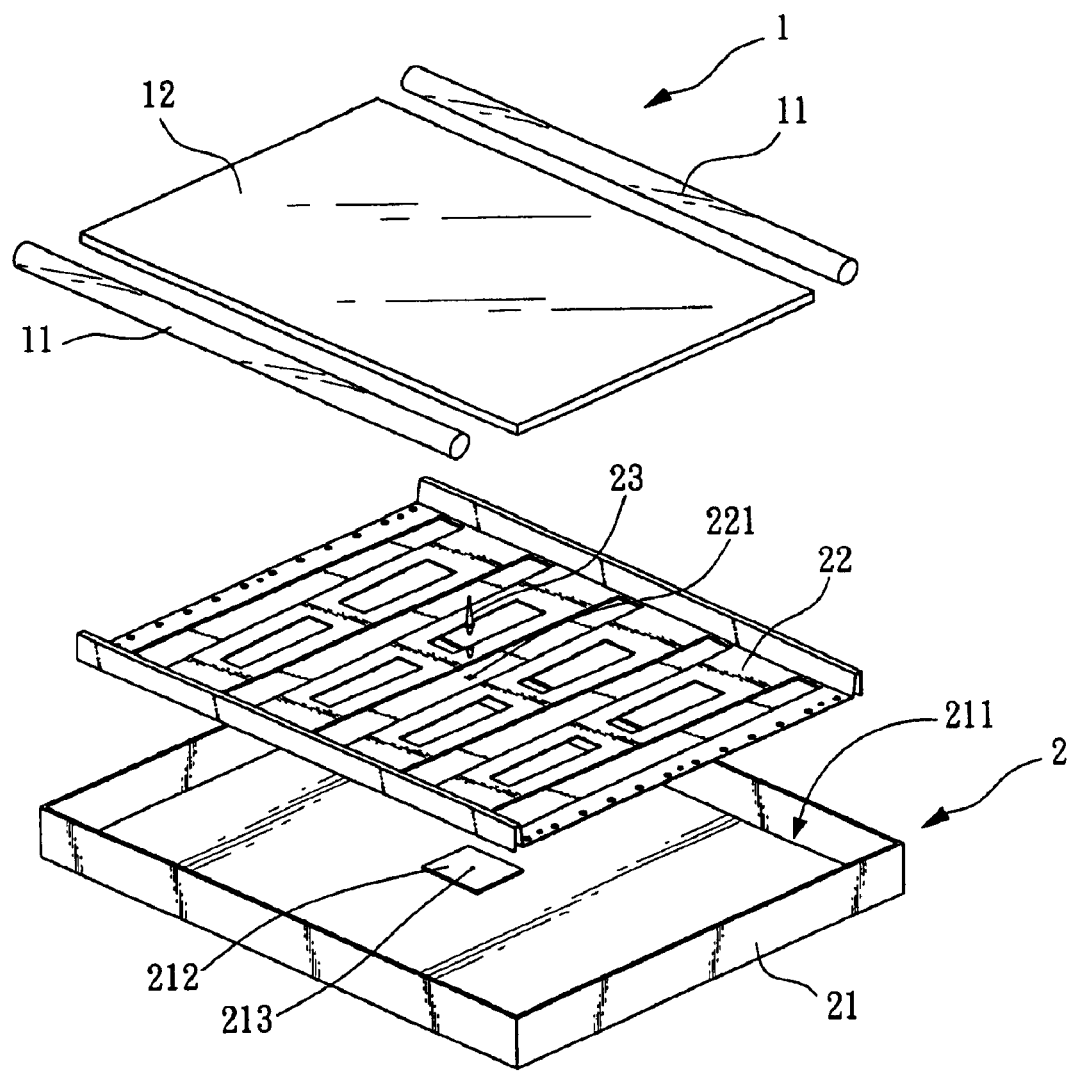
FIG. 1 is an exploded structural illustration showing an illuminated logo device cooperated with a display in accordance to the present invention.
Figure 2:
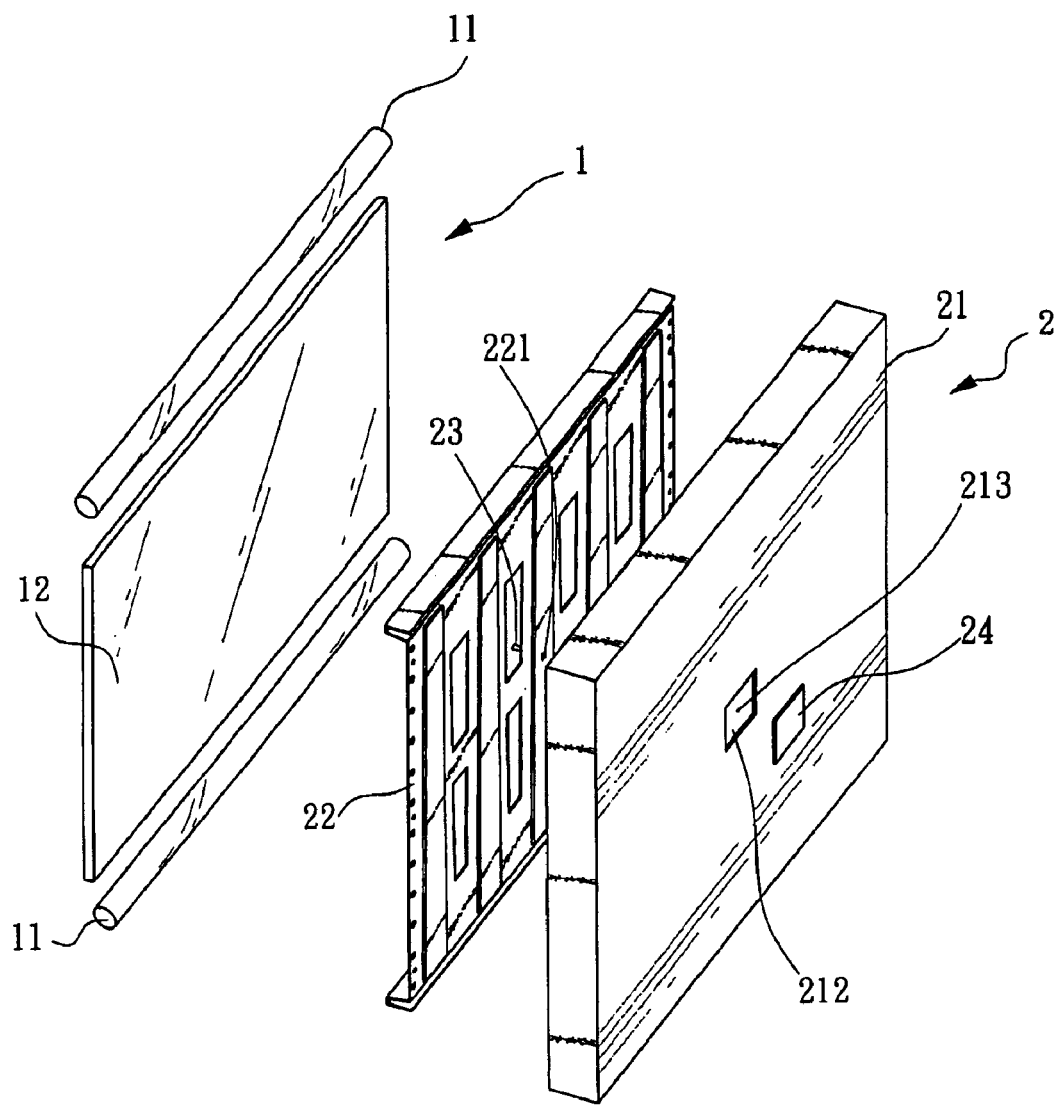
FIG. 2 is another exploded structural illustration showing the illuminated logo device in accordance to the present invention.

Please refer to FIG. 1 and FIG. 2, which are two exploded structural illustrations showing an illuminated logo device cooperated with a display. The illuminated logo device 2 is applied on the display 1. The display 1 is used for displaying data to an operator. The display 1 has at least a light source 11 and a light guiding plate 12. In this preferred embodiment of the present invention, there are two light source 11 located at two sides of the display 1. The number of light source may also be adjusted by a person with ordinary skills in the art. Besides, lights of the light sources 11 are distributed uniformly by the light guiding plate 12.

The illuminated logo device 2 has a logo 24, a casing 21, a lid 22, and a light transmitting device 23. A groove 212 is arranged on the casing 21 for receiving the logo 24, and the groove has a first opening 213. The casing 21 can be manufactured in one piece by an injection molding method. On the other hand, the casing 21 may also be manufactured by a die-casting molding method with an aluminum alloy. The lid 22 is positioned above the casing 21 and is installed inside an encapsulating space 211 of the casing 21. The lid 22 is positioned a predetermined distance away from the casing 21. The lid has a through hole 221 corresponding to the first opening 213 of the casing 21. Besides, the lid 22 can be manufactured by a die-casting molding method with an aluminum alloy.

Figure 4:
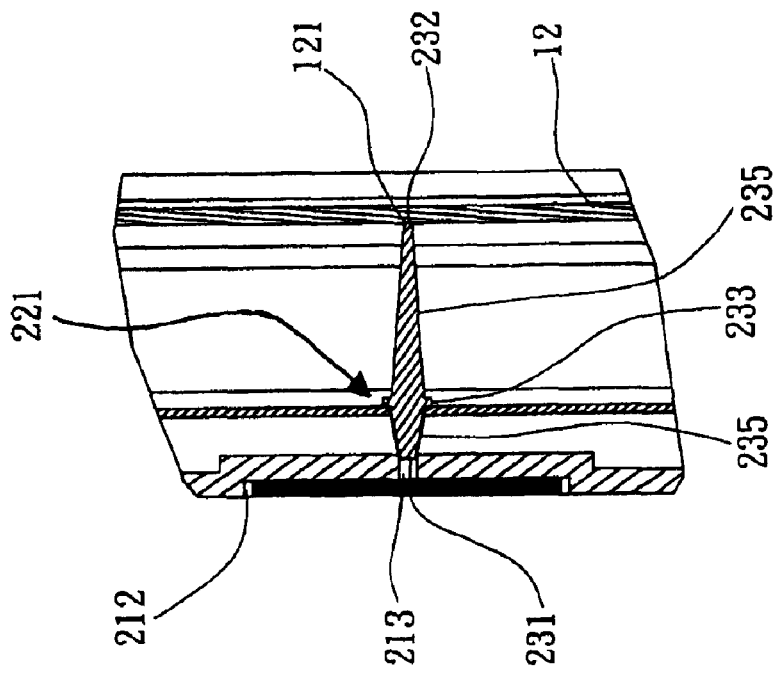
FIG. 4 is an enlarged sectional side view showing the A section of FIG. 3.
Figure 3:
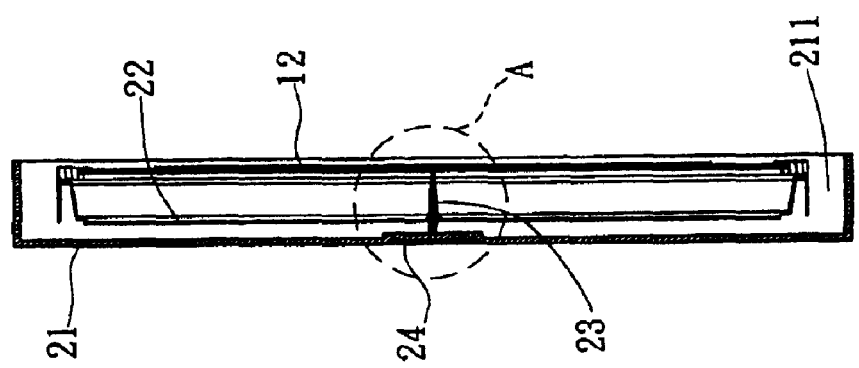
FIG. 3 is a sectional side view showing the illuminated logo device in accordance to the present invention.

Please refer to FIG. 3 and FIG. 4, which is a sectional side view showing the illuminated logo device 2 and an enlarged sectional side view of A section in FIG. 3. The light transmitting device 23 is positioned in the through hole 221 and the first opening 213. The light transmitting device 23 is made of light-guiding materials, such as: acrylic materials, for guiding lights of the light sources 11. Moreover, the light transmitting device 23 is in a column shape having several cross-sectional areas for transmitting sufficient lights effectively. In this preferred embodiment, the light transmitting device 23 is in a shape of a circular column. In other embodiment, of course, the light transmitting device 23 may in a shape of a square pillar or another polygon pillar. Such kind of shape variation can be executed by those skilled in the arts, so detailed descriptions are not presented herein repetitiously.

The light transmitting device 23 has a first end surface 231 and a second end surface 232, and the first end surface 231 is faced to the first opening 213 of the casing 21. The light guiding plate 12 has a second opening 121 faced to the second end surface 232 of the light transmitting device 23. The light transmitting device 23 further has a third end surface 233 that is arranged between the first end surface 231 and the second end surface 232. Furthermore, the third end surface 233 is arranged in the through hole 221 of the lid 22. In this preferred embodiment, the first end surface 231 has a first cross-sectional area, the second end surface 232 has a second cross-sectional area, and the third end surface 233 has a third cross-sectional area. The first cross-sectional area is smaller than the third cross-sectional area, and the second end cross-sectional area is also smaller than the third cross-sectional area. When lights of light source 11 are distributed uniformly onto the light guiding plate 12, lights can transmit into the second end surface 232 of the light transmitting device 23 through the first opening 121.

Since the second cross-sectional area of second end surface 232 is smaller than the third cross-sectional area of the third end surface 233, lights are thereby diffused. Furthermore, the third cross-sectional area of third end surface 233 is larger than the first cross-sectional area of the first end surface 231, so lights are focused and concentrated to the first end surface 231. Lights are then guided into the illuminated logo device 2 to illuminate the logo 24 without any additional light source. In addition, a reflective device 235 may be installed outside the light transmitting device 23. For example, the reflective device 235 can be a light-reflecting film adhered to the light transmitting device 23, or coating a reflective lacquer capable of reflecting light coated on the light transmitting device 23. Therefore, lights reached the second end surface 232 can be reflected back to the first end surface 231, and then finally transmitted to the logo 24.

From above description of the illuminated logo device according to the present invention, lights of the display can be guided to illuminate the logo, so no additional light source is needed for the logo only. The shortcomings of the prior arts are really solved. The present invention satisfies the needs required by the industry to thereby enhance its product's competition capability.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An illuminated logo device positioned on a display having a light source and a light guiding plate, lights of the light source being transmitted into the light guiding plate, the illuminated logo device comprising:

a logo;

a casing having an encapsulating space, and a groove being arranged on the casing for receiving the logo, the groove having a first opening;

a lid positioned above the casing and a predetermined distance away from the casing, the lid having a through hole corresponding to the first opening; and a light transmitting device positioned in the through hole and the first opening, the light transmitting device having a first end surface and a second end surface;

wherein the first end surface of the light transmitting device is faced to the first opening and the second end surface contacts the light guiding plate for guiding lights of the light source to the logo via the light transmitting device and the light guiding plate, such that the logo is illuminated.

2. The illuminating logo device according to claim 1, wherein the light transmitting device is made of light-guiding material.

3. The illuminating logo device according to claim 2, wherein the light-guiding material is an acrylic material.

4. The illuminating logo device according to claim 1, wherein the light transmitting device has a third end surface positioned in the through hole, the first end surface has a first cross-sectional area, the second end surface has a second cross-sectional area, the third end surface has a third cross-sectional area, and the first cross-sectional area is smaller than the third cross-sectional area.

5. The illuminating logo device according to claim 4, wherein the second end cross-sectional area is smaller than the third cross-sectional area.

6. The illuminating logo device according to claim 1, wherein the second end surface of the light transmitting device is faced to a second opening of the light guiding plate.

7. The illuminating logo device according to claim 1, further comprising a reflective device installed outside the light transmitting device.

8. The illuminating logo device according to claim 7, wherein the reflective device is a light-reflecting film adhered to the light transmitting device.

9. The illuminating logo device according to claim 7, wherein the reflective device is a reflective lacquer capable of reflecting light coated on the light transmitting device.

* * * * *